(12) United States Patent
Jin et al.

(10) Patent No.: US 11,088,423 B2
(45) Date of Patent: Aug. 10, 2021

(54) SECONDARY BATTERY AND BATTERY MODULE

(71) Applicant: Contemporary Amperex Technology Co., Limited, Ningde (CN)

(72) Inventors: Haizu Jin, Ningde (CN); Dongyang Shi, Ningde (CN); Ning Chen, Ningde (CN); Zhenhua Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 211 days.

(21) Appl. No.: 16/424,026

(22) Filed: May 28, 2019

(65) Prior Publication Data

US 2020/0212406 A1 Jul. 2, 2020

(30) Foreign Application Priority Data

Dec. 29, 2018 (CN) .......................... 201811646492.6

(51) Int. Cl.
*H01M 2/26* (2006.01)
*H01M 50/531* (2021.01)

(52) U.S. Cl.
CPC ................................ *H01M 50/531* (2021.01)

(58) Field of Classification Search
CPC ............... H01M 50/531; H01M 10/04; H01M 10/0431; H01M 50/538; Y02E 60/10
See application file for complete search history.

(56) References Cited

U.S. PATENT DOCUMENTS

| 2011/0052963 | A1* | 3/2011 | Lee | ........................ | H01M 50/10 |
| | | | | | 429/148 |
| 2012/0135283 | A1* | 5/2012 | Lee | ..................... | H01M 10/052 |
| | | | | | 429/82 |
| 2013/0084471 | A1* | 4/2013 | Han | ..................... | H01M 50/147 |
| | | | | | 429/7 |
| 2013/0095372 | A1* | 4/2013 | Kim | ..................... | H01M 50/572 |
| | | | | | 429/178 |
| 2014/0315052 | A1* | 10/2014 | Byun | .................. | H01M 50/572 |
| | | | | | 429/61 |
| 2014/0349149 | A1* | 11/2014 | Kim | ..................... | H01M 50/581 |
| | | | | | 429/61 |
| 2016/0079583 | A1* | 3/2016 | Kishimoto | .......... | H01M 50/538 |
| | | | | | 429/211 |

FOREIGN PATENT DOCUMENTS

| CN | 105609882 | A | 5/2016 |
| CN | 207183466 | U | 4/2018 |
| CN | 108198989 | A | 6/2018 |
| CN | 108598353 | A | 9/2018 |
| CN | 208045591 | U | 11/2018 |
| CN | 209217068 | U | 8/2019 |
| CN | 209298235 | U | 8/2019 |
| CN | 209401756 | U | 9/2019 |
| CN | 209571433 | U | 11/2019 |
| JP | 2006236790 | A | 9/2006 |
| JP | 2007073317 | A | 3/2007 |
| KR | 101776898 | B1 | 9/2017 |
| WO | 2012023434 | A1 | 2/2012 |
| WO | 2017204137 | A1 | 11/2017 |

OTHER PUBLICATIONS

The partial European search report dated Dec. 12, 2019 for European Application No. 19177512.1, 17 pages.
PCT International Search Report for PCT/CN2019/119949, dated Mar. 2, 2020, 10 pages.

\* cited by examiner

*Primary Examiner* — Muhammad S Siddiquee
(74) *Attorney, Agent, or Firm* — Law Offices of Liaoteng Wang

(57) ABSTRACT

The disclosure relates to a secondary battery and a battery module. The secondary battery comprises: a case comprising a receiving hole having an opening; a cap assembly connected with the case to close the opening; an electrode assembly disposed in the receiving hole, wherein the electrode assembly comprises two end surfaces opposite to each other in a first direction and tabs extending from respective end surfaces, and there are two or more electrode assemblies stacked in the axial direction; and a current collector comprising an extending portion and a current collecting portion connected to the tab, wherein the extending portion extends in the axial direction, the current collecting portion comprises a connecting end extending in a second direction perpendicular to both the axial direction and the first direction, and is connected to an end of the extending portion away from the cap assembly through the connecting end.

19 Claims, 9 Drawing Sheets

SECONDARY BATTERY AND BATTERY MODULE

CROSS-REFERENCE TO RELATED APPLICATION

This application is based on and claims priority to Chinese Patent Application No. 201811646492.6 filed on Dec. 29, 2018, which is incorporated herein by reference in its entirety.

TECHNICAL FIELD

The disclosure relates to the technical field of battery, and in particular to a secondary battery and a battery module.

BACKGROUND

With the development of science and technology, secondary batteries are widely used in portable electronic devices such as mobile phones, digital video cameras and laptop computers, and may be widely used in large and medium-sized electric devices such as energy storage facilities and electric vehicles, such as electric cars and electric bicycles. The secondary battery becomes important technical means to solve global problems such as energy crisis and environmental pollution. In the prior art, a secondary battery includes a case, an electrode assembly disposed within the case, and a current collector connected to the electrode assembly. The electrode assembly comprises a flat body and a tab extending from the body. In the prior art, the current collector is disposed between the tab and the case, and a connecting region of the current collector extends along an axial direction of a receiving hole in the case, so that the current collector occupies much space of the case in the axial direction, which has adverse effect on the energy density of the secondary battery.

SUMMARY

According to embodiments of the disclosure, there is provided a secondary battery and a battery module. The secondary battery comprises a current collector having a current collecting portion and an extending portion intersecting with each other such that the current collecting portion connected to the tab extends in a second direction. Therefore, the occupied spaces in the receiving hole of the case in the axial direction can be reduced, and it is advantageous to increase the energy density of the secondary battery.

In one aspect, embodiments of the disclosure provide a secondary battery comprising: a case comprising a receiving hole having an opening; a cap assembly sealingly connected with the case to close the opening; an electrode assembly disposed in the receiving hole, wherein the electrode assembly comprises two end surfaces opposite to each other in a first direction perpendicular to an axial direction of the receiving hole and tabs extending from respective end surfaces, and there are two or more electrode assemblies which are stacked in the axial direction; and a current collector comprising an extending portion and a current collecting portion fixedly connected to the tab, wherein the extending portion extends in the axial direction, the current collecting portion comprises a connecting end extending in a second direction perpendicular to both the axial direction and the first direction, and the current collecting portion is connected to an end of the extending portion away from the cap assembly through the connecting end.

According to an aspect of embodiments of the disclosure, there are two or more extending portions which are spaced apart in the second direction, and the extending portions and the current collecting portions are disposed in one-to-one correspondence.

According to an aspect of embodiments of the disclosure, both the number of the extending portions and the number of the current collecting portions are identical with the number of the electrode assemblies, and the extending portions, the current collecting portions and the tabs are disposed in one-to-one correspondence.

According to an aspect of embodiments of the disclosure, the current collecting portions are spaced apart in the axial direction, the tabs are spaced apart in the axial direction, and the current collecting portions do not overlap in the axial direction and the tabs do not overlap in the axial direction.

According to an aspect of embodiments of the disclosure, an axial projection of the current collecting portion and an axial projection of the tab at least partially overlap with each other, and an axial projection of the extending portion and the axial projection of the tab at least partially overlap with each other.

According to an aspect of embodiments of the disclosure, the current collecting portion comprises a connecting surface for fixedly connecting with the tab, and a surface of the current collecting portion away from the extending portion forms the connecting surface.

According to an aspect of embodiments of the disclosure, the current collecting portion has a sheet shape, and a thickness direction of the current collecting portion is parallel to the first direction.

According to an aspect of embodiments of the disclosure, the current collecting portion has a sheet shape, and a thickness direction of the current collecting portion is parallel to the axial direction.

According to an aspect of embodiments of the disclosure, each electrode assembly comprises two electrode units which are stacked in the axial direction, wherein the electrode unit comprises a sub-end-surface and a sub-tab extending from the sub-end-surface, two sub-end-surfaces at a same side form the end surface, two sub-tabs at a same side connect together and form the tab, and the sub-tab of one electrode unit extends in the axial direction from a region of the sub-end-surface close to another electrode unit.

According to an aspect of embodiments of the disclosure, the electrode unit comprises two wide surfaces and two narrow surfaces for connecting the two wide surfaces, wherein the two wide surfaces are disposed opposite to each other in the axial direction, the wide surfaces and the narrow surfaces are alternatively disposed, and the tab extends from a region of the end surface close to the two adjacent wide surfaces of the two electrode units.

According to an aspect of embodiments of the disclosure, the sub-tab is closer to a narrow surface than another narrow surface.

According to embodiments of the disclosure, the secondary battery comprises a case, an electrode assembly disposed within the case, and a current collector. The current collector comprises an extending portion extending in the axial direction of the receiving hole of the case and a current collecting portion intersecting with the extending portion. The current collecting portion connected to the extending portion extends in the second direction and is connected to the tab. Therefore, the current collecting portion has a reduced occupied space in the case in the axial direction, and it is advantageous to increase the energy density of the secondary battery.

In another aspect, embodiments of the disclosure provide a battery module comprising two or more secondary batteries according to the above embodiments which are arranged side by side.

BRIEF DESCRIPTION OF THE DRAWINGS

Features, advantages, and technical effects of exemplary embodiments of the disclosure will be described below with reference to accompanying drawings.

Figure 1:
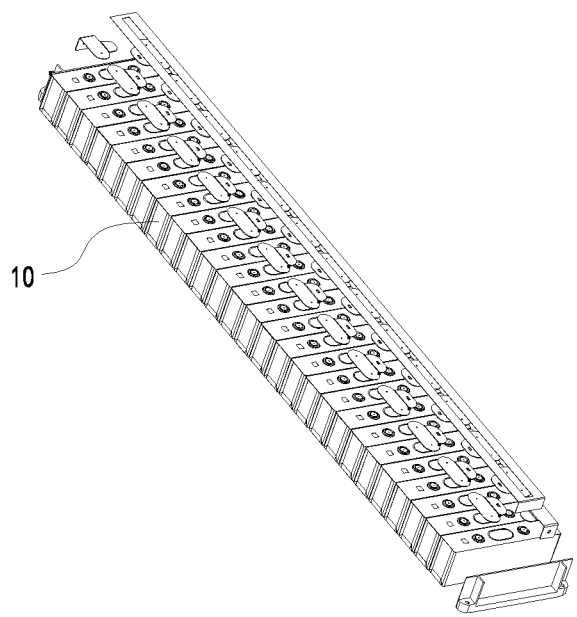
FIG. 1 is a structural schematic diagram of a battery module according to an embodiment of the disclosure.

The views are not necessarily plotted in actual proportion in the drawings.

REFERENCE SIGNS IN THE DRAWINGS 10 secondary battery;
11 case;
11a receiving hole;
12 cap assembly;
121 cap plate;
122 electrode terminal;
13 electrode assembly;
13a end surface;
13b tab;
131 electrode unit;
131a wide surface;
131b narrow surface;
131c sub-end-surface;
131d sub-tab;
14 current collector;
141 extending portion;
142 current collecting portion;
142a connecting end;
142b connecting surface;
143 first sheet;
144 second sheet;
144a protrusion;
X axial direction;
Y first direction;
Z second direction;
20 battery module.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure. That is, the disclosure is not limited to the described embodiments.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", "third" and the like are configured for descriptive purposes only and are not to be construed as indicating or implying relative importance.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

For better understanding of the disclosure, a battery module 20 and a secondary battery 10 according to embodiments of the disclosure will be described below in detail with reference to FIGS. 1 to 11.

As shown in FIG. 1, the embodiments of the disclosure further provide a battery module 20, comprising two or more secondary batteries 10 according to the embodiment and a busbar for connecting two of the secondary batteries 10. The two or more secondary batteries 10 are arranged side by side in one direction. One end of the busbar is fixedly connected to one of two secondary batteries 10, and the other end of the busbar is fixedly connected to the other one of the two secondary batteries 10. The two or more secondary batteries 10 according to the embodiment are arranged side by side in their thickness direction to form the battery module 20.

Figure 2:
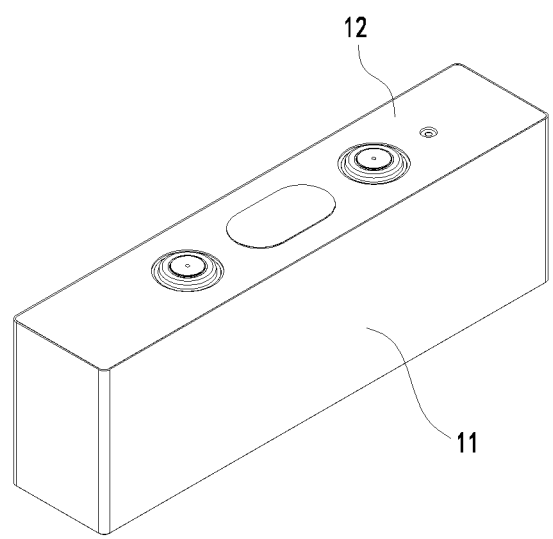
FIG. 2 is a structural schematic diagram of a secondary battery according to an embodiment of the disclosure.
Figure 3:
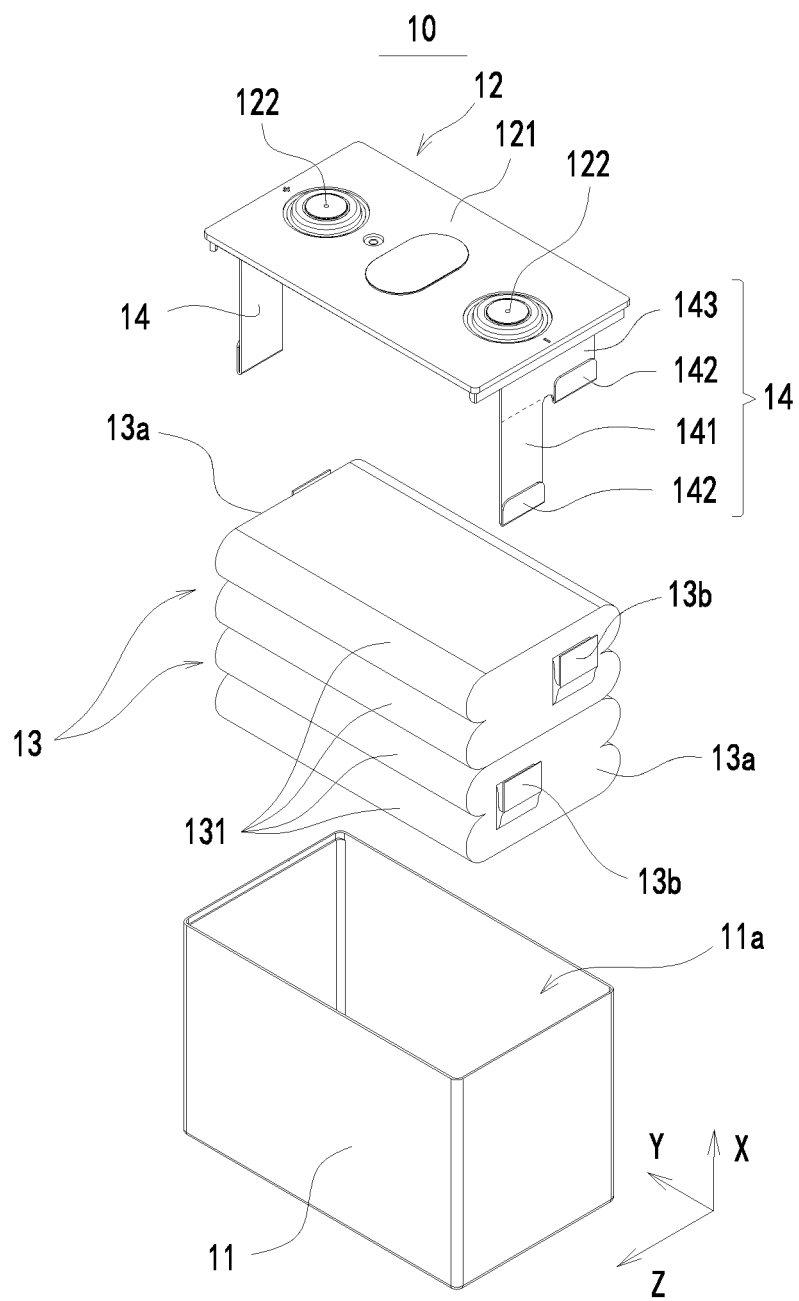
FIG. 3 is an exploded structural view of a secondary battery according to an embodiment of the disclosure.

Referring to FIGS. 2 and 3, the secondary battery 10 according to embodiments of the disclosure comprises a case 11, an electrode assembly 13 disposed in the case 11, and a cap assembly 12 that is sealingly connected with the case 11.

The case 11 according to the embodiment may be formed in a shape of quadrangular prism or in other shapes. The case 11 comprises a receiving hole 11a having an opening. The receiving hole 11a can accommodate the electrode assembly 13 and electrolyte. The case 11 can be made of a material such as aluminum, aluminum alloy and plastic.

The electrode assembly 13 according to the embodiment comprises two end surfaces 13a opposite to each other in a first direction Y perpendicular to an axial direction X of the receiving hole 11a, and tabs 13b extending from each end surface 13a. According to embodiments of the disclosure, the axial direction X of the receiving hole 11a is parallel to an extending direction of the receiving hole 11a. According to the embodiment, each tab 13b extends from an end surface 13a of the electrode assembly 13. Each electrode assembly 13 comprises two tabs 13b opposite to each other in the first direction Y, wherein one tab 13b is a positive tab, and the other is a negative tab.

Figure 4:
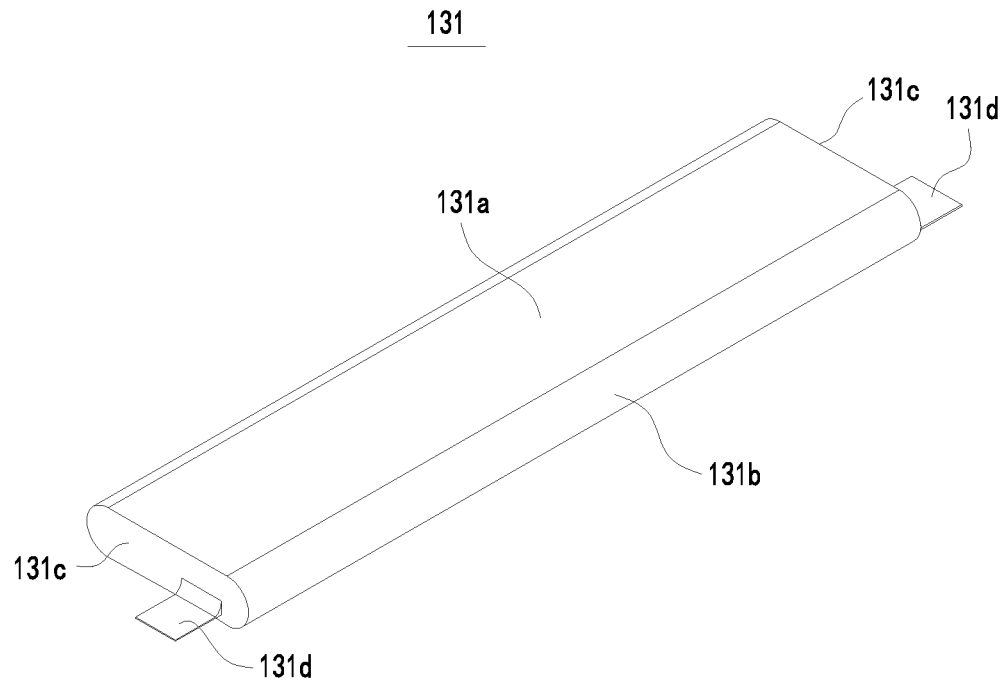
FIG. 4 is a structural schematic diagram of an electrode unit according to an embodiment of the disclosure.
Figure 5:
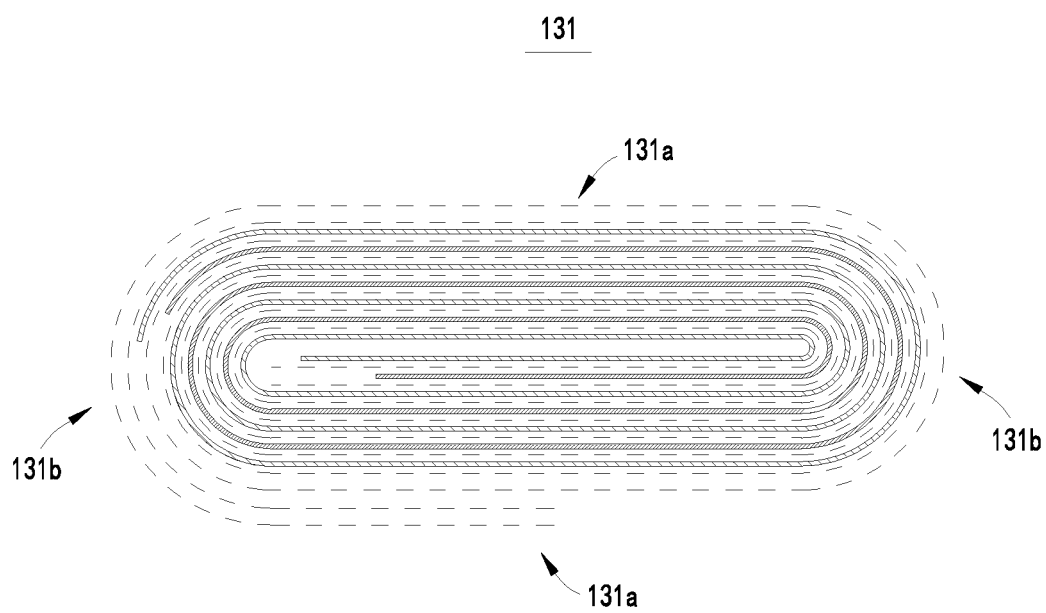
FIG. 5 is a structural section view of an electrode unit according to an embodiment of the disclosure.

Referring to FIGS. 4 and 5, the electrode assembly 13 according to the embodiment comprises one or two or more electrode units 131 stacked in the axial direction X of the receiving hole 11a. The electrode unit 131 comprises a sub-end-surface 131c and a sub-tab 131d extending from the sub-end-surface 131c. According to the embodiment, a body of the electrode unit 131 and a sub-tab 131d connected to the body can be formed by stacking or winding a first electrode plate, a second electrode plate, and a separator together. The separator is an insulator between the first electrode plate and the second electrode plate. The electrode unit 131 according to the embodiment comprises a layer of separator, a layer of first electrode plate, another layer of separator and a layer of second electrode plate. In the embodiment, the description is made by exemplarily taking the first electrode plate as a positive electrode plate and the second electrode plate as a negative electrode plate. Similarly, in other embodiments, the first electrode plate may be a negative electrode plate, and the second electrode plate may be a positive electrode plate. Furthermore, a positive active material is coated on a coating region of the positive electrode plate, while a negative active material is coated on a coating region of the negative electrode plate. A plurality of uncoated regions extending from the body serve as the sub-tab 131d. An electrode unit 131 comprises two sub-tabs 131d opposite to each other in the first direction Y, i.e., a positive tab and a negative tab. The positive tab extends from the coating region of the positive electrode plate while the negative tab extends from the coating region of the negative electrode plate. The first direction Y is perpendicular to the axial direction X. The term "perpendicular" here is not limited to a strict perpendicularity in a mathematical sense. The end surface 13a of each electrode assembly 13 comprises the sub-end-surfaces 131c of the respective electrode units 131. That is, all the sub-end-surfaces 131c of the electrode units 131 collectively form the end surface 13a. Tabs 13b of an electrode assembly 13 comprise sub-tabs 131d of respective electrode units 131. That is, all the sub-tabs 131d of the respective electrode units 131 together form the tabs 13b. In an embodiment, referring to FIG. 4, the electrode unit 131 has a flat shape comprising two wide surfaces 131a and two narrow surfaces 131b connecting the two wide surfaces 131a. The two wide surfaces 131a are disposed opposite to each other in the axial direction X. The wide surfaces 131a and the narrow surfaces 131b are alternately arranged.

The cap assembly 12 according to the embodiment is sealingly connected with the case 11 to close the opening. In an embodiment, the cap assembly 12 comprises a cap plate 121 and electrode terminals 122. The cap assembly 12 is sealingly connected with the case 11 through the cap plate 121. The electrode terminal 122 is disposed on the cap plate 121 and is electrically connected to the electrode assembly 13 through a current collector 14.

Referring to FIG. 3, the secondary battery 10 according to the embodiment of the disclosure comprises two or more electrode assemblies 13. The two or more electrode assemblies 13 are stacked in the axial direction X. The current collector 14 comprises an extending portion 141 and a current collecting portion 142 that is fixedly connected to the tab 13b. The extending portion 141 extends in the axial direction X. The current collecting portion 142 comprises a connecting end 142a extending in a second direction Z perpendicular to both the axial direction X and the first direction Y. The current collecting portion 142 is connected to an end of the extending portion 141 away from the cap assembly 12 through the connecting end 142a. The extending portion 141 is disposed to intersect the current collecting portion 142. The current collecting portion 142 connected to the extending portion 141 extends in the second direction Z and is connected to the tab 13b. Therefore, the current collecting portion 142 does not occupy the space of the case 11 in the axial direction X, and it is advantageous to reduce a dimension of the secondary battery 10 in the axial direction X or increase a dimension of the electrode assembly 13 in the axial direction X, such that an energy density of the secondary battery 10 can be increased.

Figure 6:
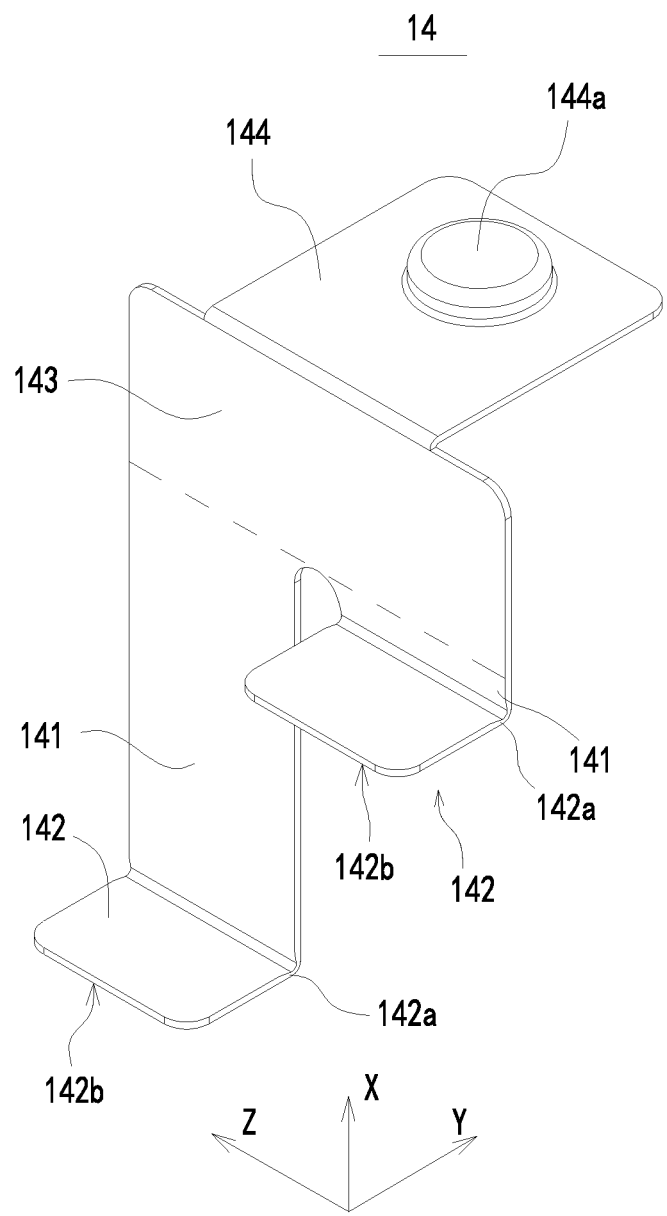
FIG. 6 is a structural schematic diagram of a current collector according to an embodiment of the disclosure.
Figure 7:
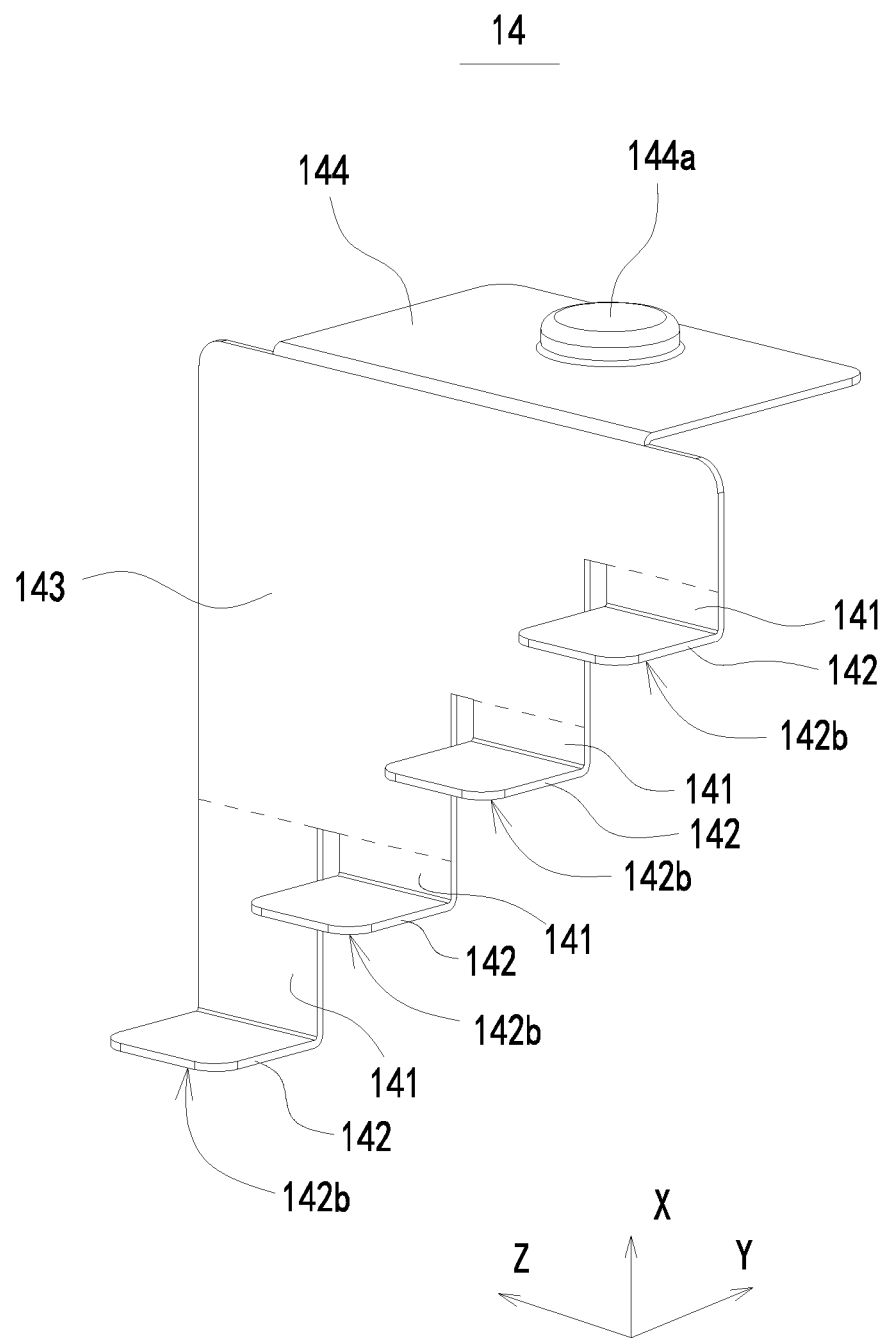
FIG. 7 is a structural schematic diagram of a current collector according to another embodiment of the disclosure.

Referring to FIGS. 6 and 7, according to the embodiment, there are two or more extending portions 141. The two or more extending portions 141 are spaced apart in the second direction Z. The extending portions 141 are disposed in one-to-one correspondence with the current collecting portions 142. The number of the extending portions 141 is the same as the number of the current collecting portions 142. One current collector 14 can be connected to the tabs 13b of the electrode assemblies 13 through two or more current collecting portions 142. Thus, the discharge capability and the adaptability of the current collector 14 can be improved. The number of the electrode assemblies 13 may be larger than or equal to the number of the current collecting portions 142. When the number of the electrode assemblies 13 is larger than the number of the current collecting portions 142, the excess tabs 13b can be connected to other current collecting portions 142. Furthermore, since a large amount of heat is generated in a connection region between the current collecting portion 142 and the tab 13b, when multiple current collecting portions 142 and multiple tabs 13b are connected, it is advantageous to dissipate heat released from connection regions between the current collecting portions 142 and the tabs 13b. Compared to a case where only one current collecting portion 142 is connected to multiple tabs 13b, it is possible to prevent high temperatures in the connection regions between the current collecting portion 142 and the tabs 13b due to heat accumulation. The connection stability of the connection regions between the current collecting portions 142 and the tab 13b can be ensured.

Figure 8:
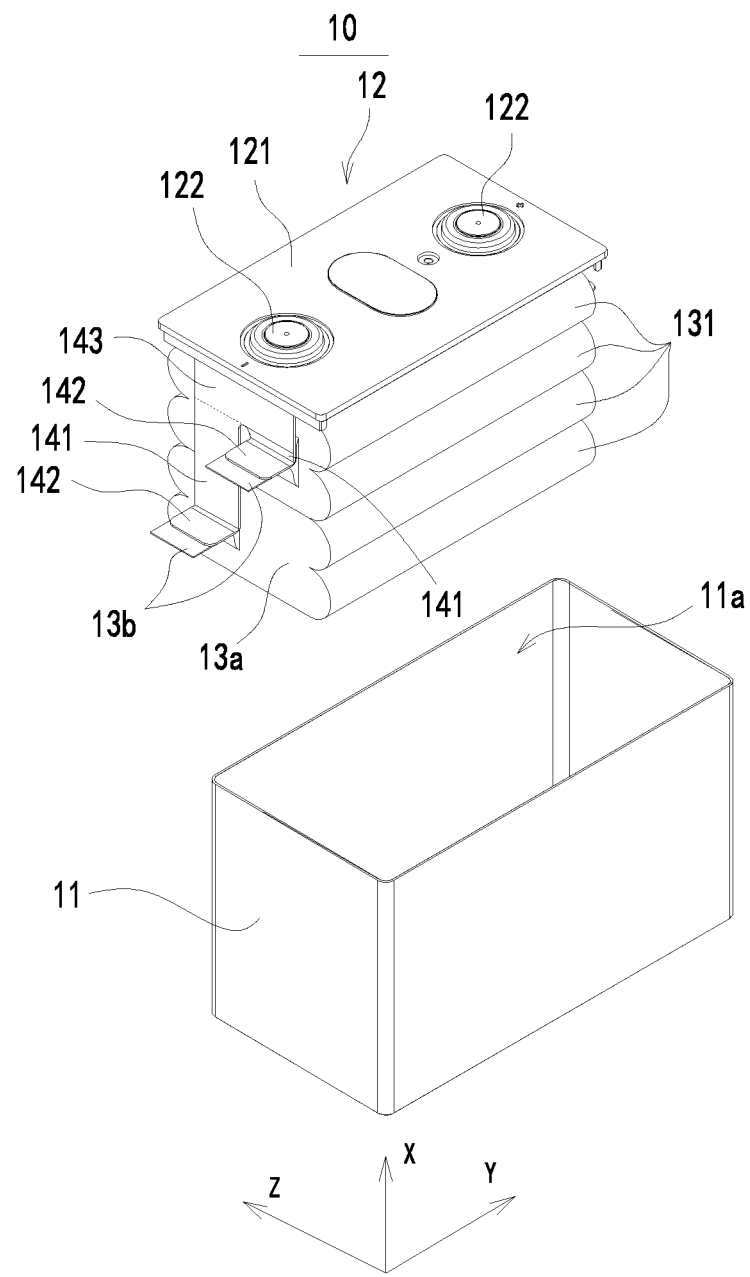
FIG. 8 is an exploded structural view of a secondary battery according to another embodiment of the disclosure.

In an embodiment, referring to FIG. 8, the number of the extending portions 141 and the number of the current collecting portions 142 are the same as the number of the electrode assemblies 13, and the extending portions 141 and the current collecting portions 142 are disposed in one-to-one correspondence with the tabs 13b. By using only one current collector 14 according to the embodiment, it is possible to charge or discharge all the electrode assemblies 13. Therefore, the number of components can be reduced, a compact internal layout of the secondary battery 10 can be achieved, and it is advantageous to increase the energy density of the secondary battery 10.

In an embodiment, as shown in FIG. 6, the respective current collecting portions 142 are spaced apart in the axial direction X. Accordingly, the respective tabs 13b extending from the electrode assemblies 13 are also spaced apart in the axial direction X. Furthermore, the respective extending portions 141 do not overlap in the axial direction X. The respective tabs 13b do not overlap in the axial direction X. In this way, since the current collecting portion 142 and the tab 13b are disposed in one-to-one correspondence, the respective current collecting portions 142 are mutually offset in the axial direction X and the respective tabs 13b are mutually offset in the axial direction X. On one side, it will benefit heat dissipation of the respective connecting regions. On the other side, it is advantageous to perform the welding operation on the current collecting portions 142 and the tabs 13b in the connecting process since their positions do not interfere with each other. Since the two or more extending portions 141 are spaced apart in the second direction Z while the extending portions 141 are spaced apart in the axial direction X, when the respective current collecting portions 142 are welded to the respective tabs 13b, two adjacent current collecting portions 142 or two adjacent extending portions 141 do not interfere with each other. The position interference will result in failure to weld or increase welding difficulty. Alternatively, as shown in FIGS. 6 and 7, the ends of the two or more extending portions 141 are offset from each other in the second direction Z and do not overlap in the axial direction X, while the respective ends are arranged in a stepwise manner in the axial direction X. Accordingly, the two or more current collecting portions 142 and the two or more tabs 13b are also arranged in a stepwise manner in the axial direction X.

In an embodiment, a projection of the current collecting portion 142 and a projection of a corresponding tab 13b in the axial direction X at least partially overlap with each other. A projection of the extending portion 141 and the projection of the corresponding tab 13b in the axial direction X at least partially overlap with each other. The extending portion 141, the current collecting portion 142, and the corresponding tabs 13b are successively distributed in the axial direction X. Thus, while the extending portion 141, the current collecting portion 142 and the corresponding tab 13b are successively distributed in the axial direction X, the occupied spaces of the extending portion 141 and the current collecting portion 142 in the second direction Z can be reduced. It is advantageous to increase the energy density of the secondary battery 10.

In an embodiment, the current collecting portion 142 has a connecting surface 142b for being fixedly connected to the tab 13b, and a surface of the current collecting portion 142 away from the extending portion 141 forms the connecting surface 142b. The tab 13b extends to a region between the current collecting portion 142 and the case 11 and is connected to the connecting surface 142b of the current collecting portion 142 away from the extending portion 141. Thus, the extending portion 141 does not interfere with the position of the tab 13b. Therefore, the tab 13b does not need to pass over the extending portion 141 in order to be connected to the extending portion 141. It is advantageous to provide a convenient connection between the tab 13b and the current collecting portion 142. The connecting faces 142b of the two or more current collecting portions 142 face away from the cap assembly 12.

Alternatively, referring to FIGS. 6 and 8, the current collecting portion 142 has a sheet shape, and a thickness direction of the current collecting portion 142 is parallel to the axial direction X. The current collecting portion 142 extends from the main body toward the case 11. In an example, the tab 13b can be connected to a surface of the current collecting portion 142 away from the cap assembly 12. The surface of the current collecting portion 142 away from the cap assembly 12 can be substantially flush with surfaces of some tabs 13b facing the current collecting portion 142. To some extent, the tab 13b can be fixedly connected to the connecting surface 142b of the current collecting portion 142 with a reduced degree of bending of the tab 13b, such that it is possible to reduce the possibility of breaking or tearing of the tab 13b due to the bending of the tab 13b. Furthermore, since there are more space at both opposite sides of the current collecting portion 142 in the axial direction X, it is convenient for a welding device to sandwich the current collecting portion 142 from the opposite sides of the current collecting portion 142 and connect the tab 13b to the current collecting portion 142 by welding. It is possible to effectively reduce the operation difficulty of the welding process.

Figure 9:
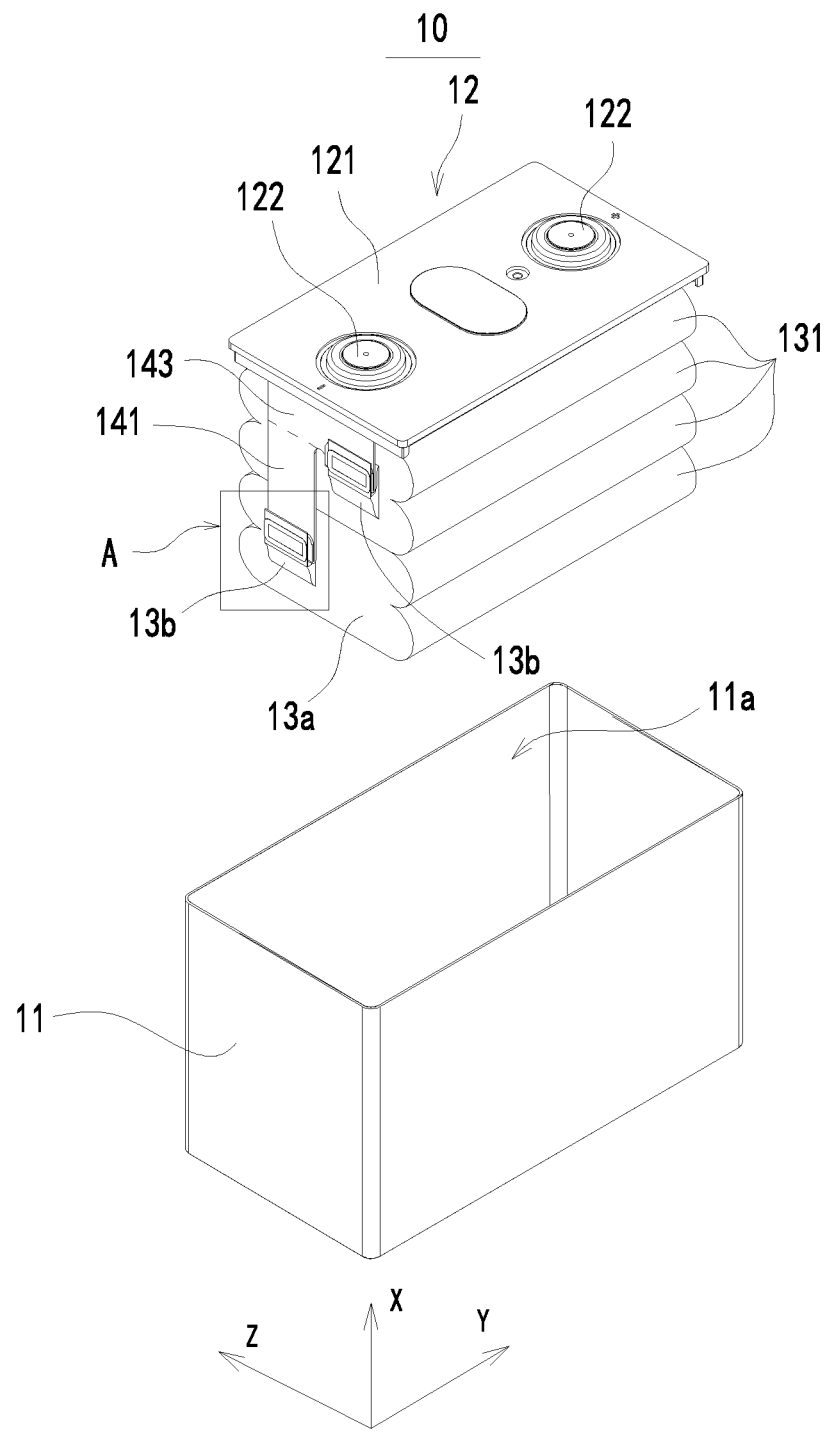
FIG. 9 is an exploded structural view of a secondary battery according to another embodiment of the disclosure.
Figure 10:
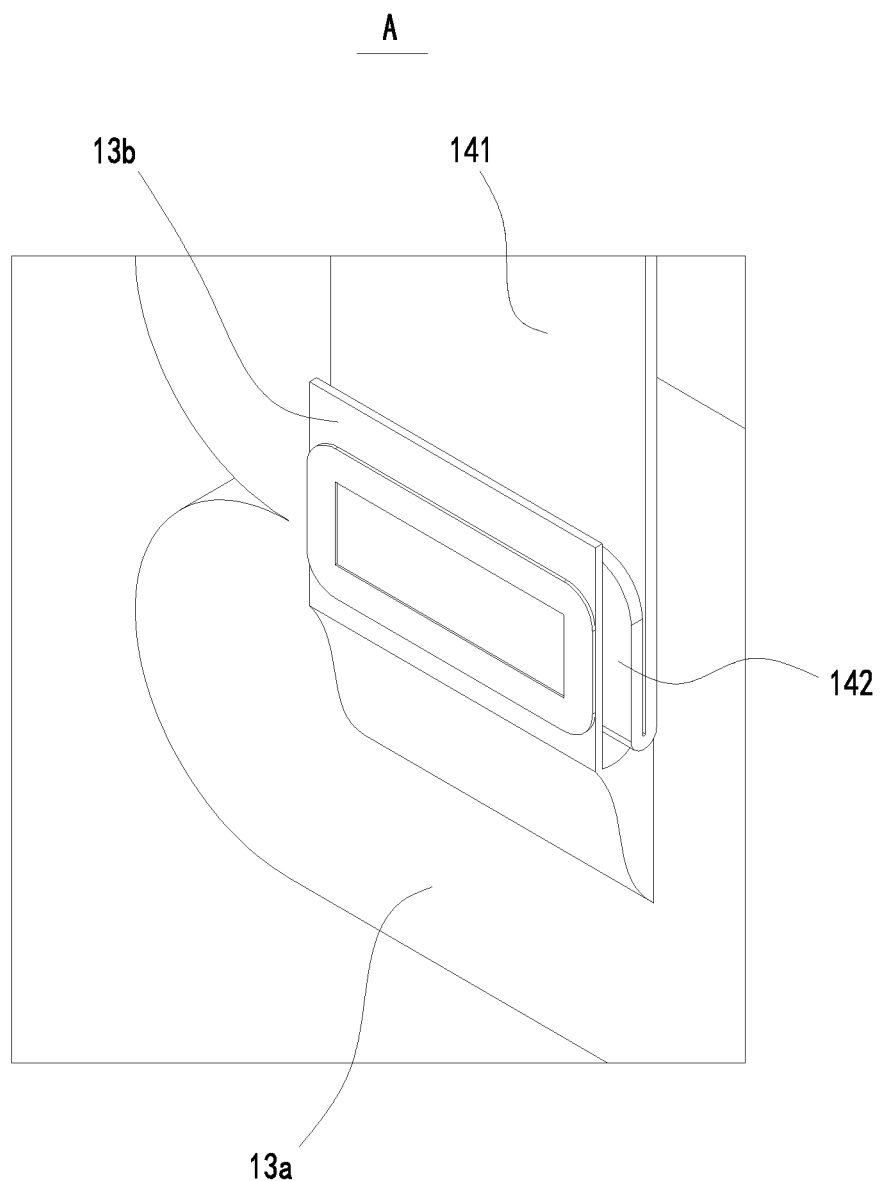
FIG. 10 is an enlarged view of a portion A in FIG. 9.
Figure 11:
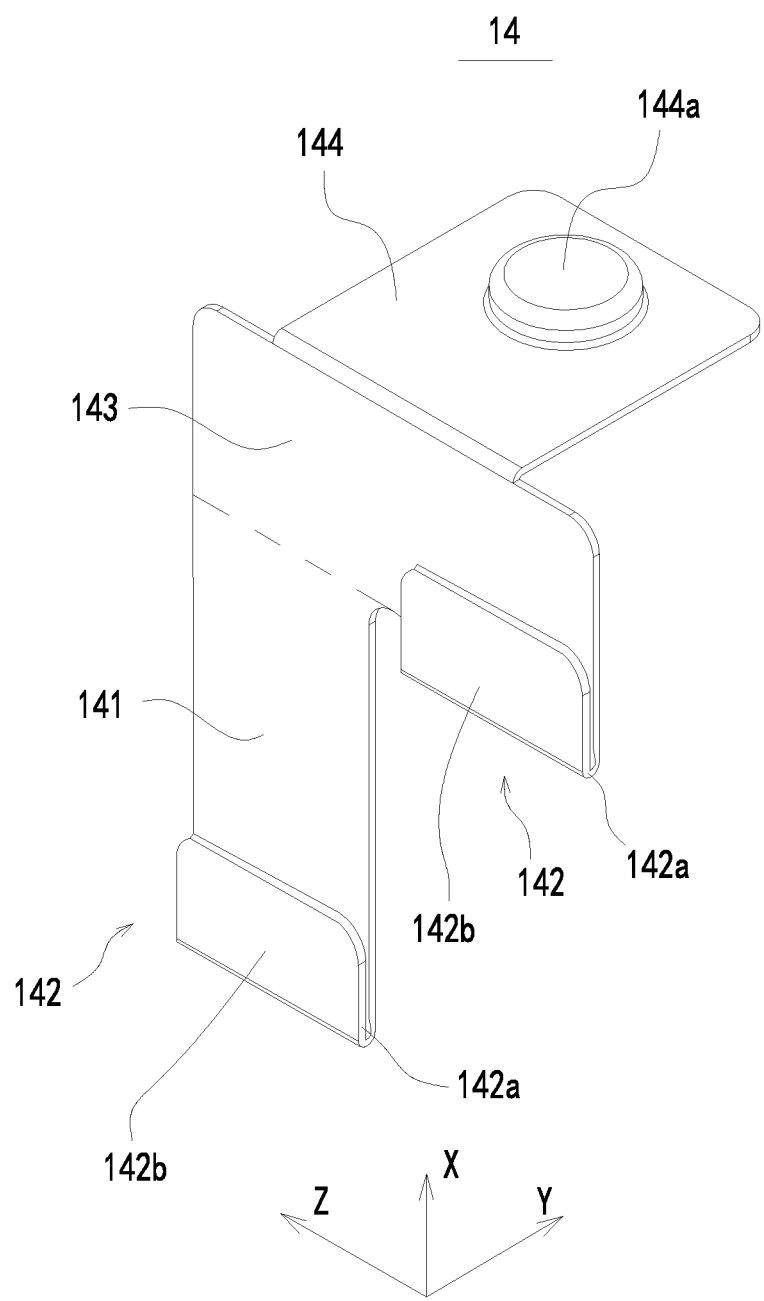
FIG. 11 is a structural schematic diagram of a current collector according to another embodiment of the disclosure.

Alternatively, referring to FIGS. 9 to 11, the current collecting portion 142 has a sheet shape, and a thickness direction of the current collecting portion 142 is parallel to the first direction Y. The current collecting portion 142 is folded with respect to the first direction Y such that the connecting surface 142b faces the case 11 or the electrode assembly 13. After the current collecting portion 142 is fixedly connected to the tab 13b, the current collecting portion 142 is folded. Thereby, the size of the current collecting portion 142 in the first direction Y can be reduced. It is advantageous to reduce the occupied space of the connection between the current collecting portion 142 and the tab 13b, and increase the energy density of the secondary battery 10. Preferably, the connecting surface 142b of the current collecting portion 142 faces the case 11. After the tab 13b is connected to the connecting surface 142b of the current collecting portion 142, an end of the tab 13b is separated from the electrode assembly 13 by the current collecting portion 142 and the extending portion 141. Thereby, it is possible to reduce the possibility of scratching or puncturing the electrode assembly 13 by the folded tab 13b.

In an embodiment, as seen in FIG. 9, each electrode assembly 13 comprises two electrode units. The two electrode units are stacked in the axial direction X. The electrode unit comprises a sub-end-surface 131c and a sub-tab 131d extending from the sub-end-surface 131c. The two sub-end-surfaces 131c at a same side form the end surface 13a. The two sub-tabs 131d at a same side connect together and form the tab 13b. The sub-tab 131d of one electrode unit extends in the axial direction X from a region of the sub-end-surface 131c close to another electrode unit. Thereby, the respective sub-tabs 131d of the two electrode units are close to each other and extend short distances to connect together and form the tab 13b that will be fixedly connected to the current collecting portion 142. Thus, on the one hand, the sub-tab 131d do not extend an excess distance to have a redundant length. When there is a redundant sub-tab 131d, the sub-tab 131d is likely to be broken and fractured at the stress concentration region. On the other hand, the extending dimension of the sub-tab 131d is controlled within a small range. The occupied space of the tab 13b formed by the sub-tabs 131d is reduced, and the energy density of the secondary battery 10 is increased.

In an embodiment, the electrode unit comprises two wide surfaces 131a and two narrow surfaces 131b connecting the two wide faces 131a. The two wide surfaces 131a are disposed opposite to each other in the axial direction X. The wide surfaces 131a and the narrow surfaces 131b are alternately disposed. The tab 13b extends from a region of the end surface 13a close to the two adjacent wide surfaces 131a of the two electrode units. Therefore, in the axial direction X, the tab 13b is substantially in a central region of the end surface 13a, it is ensured that the two sub-tabs 131d extending from the two electrode units have substantially the same size. The electrode units can be manufactured in identical process, and thus the manufacturing cost can be reduced. In an embodiment, a ratio of the size of the tab 13b to the size of the end surface 13a in the second direction Z is 1/10 to 2/5. The tab 13b according to the embodiment can be easily bent and deformed, and the possibility of breakage due to a large tensile stress during bending can be reduced. In an embodiment, there are one or two electrode units. The sub-tab 131d is biased, i.e., the sub-tab 131d is disposed closer to a narrow surface 131b with respect to another narrow surface 131b.

In an embodiment, referring to FIG. 6 or FIG. 11, the current collector 14 further comprises a first sheet 143 and a second sheet 144. The first sheet 143 and the second sheet 144 are disposed to intersect with each other. The extending portion 141 is connected to the first sheet 143 and the second sheet 144 can be connected to the electrode terminal. In the embodiment, the electrode assembly 13 is connected to the electrode terminal through the current collecting portion 142, the extending portion 141, the first sheet 143 and the second sheet 144. The thickness direction of the second sheet 144 according to the embodiment is identical with the axial direction X. The second sheet 144 comprises a protrusion 144a away from the electrode assembly 13. The second sheet 144 is electrically connected to the electrode terminal in the cap assembly 12 through the protrusion 144a.

The battery module 20 according to embodiments of the disclosure comprises a plurality of secondary batteries 10 arranged side by side in a same direction. The electrode units in the respective secondary batteries 10 according to the embodiment are stacked in the axial direction X of the receiving hole 11a of the case 11. When the electrode unit according to the embodiment expands, it mainly expands and deforms in the axial direction X of the receiving hole 11a, and it has a small expansion in a direction in which the secondary batteries 10 are arranged. Thus, a resultant expansion force accumulated in an arrangement direction of the respective secondary batteries 10 is small. In the arrangement direction of the secondary batteries 10, the battery module 20 does not need to use a structural member having a higher strength to restrain and counteract the expansion force, and a structural member with a lower strength may be used to restrain and counteract the expansion force. Thereby, the weight of the battery module 20 can be effectively reduced, the battery module 20 may have a more compact structure, and the energy density of the battery module 20 can be effectively increased. Furthermore, the battery module 20 has a small expansion or has no expansion in a thickness direction of the secondary battery 10, thus the safety in use can be effectively improved.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A secondary battery comprising:
   a case comprising a receiving hole having an opening;
   a cap assembly sealingly connected with the case to close the opening;
   an electrode assembly disposed in the receiving hole, wherein the electrode assembly comprises two end surfaces opposite to each other in a first direction perpendicular to an axial direction of the receiving hole and tabs extending from respective end surfaces, and there are two or more electrode assemblies which are stacked in the axial direction; and
   a current collector comprising an extending portion and a current collecting portion fixedly connected to the tab, wherein the extending portion extends in the axial direction, the current collecting portion comprises a connecting end extending in a second direction perpendicular to both the axial direction and the first direction, and the current collecting portion is connected to an end of the extending portion away from the cap assembly through the connecting end,
   wherein an axial projection of the current collecting portion and an axial projection of the tab at least partially overlap with each other, and an axial projection of the extending portion and the axial projection of the tab at least partially overlap with each other.

2. The secondary battery according to claim 1, wherein there are two or more extending portions which are spaced apart in the second direction, and the extending portions and the current collecting portions are disposed in one-to-one correspondence.

3. The secondary battery according to claim 2, wherein both the number of the extending portions and the number of the current collecting portions are identical with the number of the electrode assemblies, and the extending portions, the current collecting portions and the tabs are disposed in one-to-one correspondence.

4. The secondary battery according to claim 3, wherein the current collecting portions are spaced apart in the axial direction, the tabs are spaced apart in the axial direction, and the current collecting portions do not overlap in the axial direction and the tabs do not overlap in the axial direction.

5. The secondary battery according to claim 1, wherein the current collecting portion comprises a connecting surface for fixedly connecting with the tab, and a surface of the current collecting portion away from the extending portion forms the connecting surface.

6. The secondary battery according to claim 1, wherein the current collecting portion has a sheet shape, and a thickness direction of the current collecting portion is parallel to the first direction.

7. The secondary battery according to claim 1, wherein the current collecting portion has a sheet shape, and a thickness direction of the current collecting portion is parallel to the axial direction.

8. A secondary battery comprising:
   a case comprising a receiving hole having an opening;
   a cap assembly sealingly connected with the case to close the opening;
   an electrode assembly disposed in the receiving hole, wherein the electrode assembly comprises two end surfaces opposite to each other in a first direction perpendicular to an axial direction of the receiving hole and tabs extending from respective end surfaces, and there are two or more electrode assemblies which are stacked in the axial direction; and
   a current collector comprising an extending portion and a current collecting portion fixedly connected to the tab, wherein the extending portion extends in the axial direction, the current collecting portion comprises a connecting end extending in a second direction perpendicular to both the axial direction and the first direction, and the current collecting portion is connected to an end of the extending portion away from the cap assembly through the connecting end,
   wherein each electrode assembly comprises two electrode units which are stacked in the axial direction, wherein the electrode unit comprises a sub-end-surface and a sub-tab extending from the sub-end-surface, two sub-end-surfaces at a same side form the end surface, two sub-tabs at a same side connect together and form the tab, and the sub-tab of one electrode unit extends in the axial direction from a region of the sub-end-surface close to another electrode unit.

9. The secondary battery according to claim 8, wherein the electrode unit comprises two wide surfaces and two narrow surfaces for connecting the two wide surfaces, wherein the two wide surfaces are disposed opposite to each other in the axial direction, the wide surfaces and the narrow surfaces are alternatively disposed, and the tab extends from a region of the end surface close to the two adjacent wide surfaces of the two electrode units.

10. The secondary battery according to claim 9, wherein the sub-tab is closer to a narrow surface than another narrow surface.

11. The secondary battery according to claim 2, wherein the current collecting portions are spaced apart in the axial direction, the tabs are spaced apart in the axial direction, and the current collecting portions do not overlap in the axial direction and the tabs do not overlap in the axial direction.

12. The secondary battery according to claim 2, wherein an axial projection of the current collecting portion and an axial projection of the tab at least partially overlap with each other, and an axial projection of the extending portion and the axial projection of the tab at least partially overlap with each other.

13. The secondary battery according to claim 2, wherein the current collecting portion comprises a connecting surface for fixedly connecting with the tab, and a surface of the current collecting portion away from the extending portion forms the connecting surface.

14. The secondary battery according to claim 2, wherein each electrode assembly comprises two electrode units which are stacked in the axial direction, wherein the electrode unit comprises a sub-end-surface and a sub-tab extending from the sub-end-surface, two sub-end-surfaces at a same side form the end surface, two sub-tabs at a same side connect together and form the tab, and the sub-tab of one electrode unit extends in the axial direction from a region of the sub-end-surface close to another electrode unit.

15. The secondary battery according to claim 14, wherein the electrode unit comprises two wide surfaces and two narrow surfaces for connecting the two wide surfaces, wherein the two wide surfaces are disposed opposite to each other in the axial direction, the wide surfaces and the narrow surfaces are alternatively disposed, and the tab extends from a region of the end surface close to the two adjacent wide surfaces of the two electrode units.

16. A battery module comprising two or more secondary batteries which are arranged side by side, wherein the secondary battery comprises:
a case comprising a receiving hole having an opening;
a cap assembly sealingly connected with the case to close the opening;
an electrode assembly disposed in the receiving hole, wherein the electrode assembly comprises two end surfaces opposite to each other in a first direction perpendicular to an axial direction of the receiving hole and tabs extending from respective end surfaces, and there are two or more electrode assemblies which are stacked in the axial direction; and
a current collector comprising an extending portion and a current collecting portion fixedly connected to the tab, wherein the extending portion extends in the axial direction, the current collecting portion comprises a connecting end extending in a second direction perpendicular to both the axial direction and the first direction, and the current collecting portion is connected to an end of the extending portion away from the cap assembly through the connecting end,
wherein an axial projection of the current collecting portion and an axial projection of the tab at least partially overlap with each other, and an axial projection of the extending portion and the axial projection of the tab at least partially overlap with each other.

17. The battery module according to claim 16, wherein there are two or more extending portions which are spaced apart in the second direction, and the extending portions and the current collecting portions are disposed in one-to-one correspondence.

18. The battery module according to claim 17, wherein both the number of the extending portions and the number of the current collecting portions are identical with the number of the electrode assemblies, and the extending portions, the current collecting portions and the tabs are disposed in one-to-one correspondence.

19. The battery module according to claim 18, wherein the current collecting portions are spaced apart in the axial direction, the tabs are spaced apart in the axial direction, and the current collecting portions and the tabs do not overlap in the axial direction.

* * * * *